(12) United States Patent
Nodzak et al.

(10) Patent No.: US 11,983,164 B1
(45) Date of Patent: May 14, 2024

(54) SYSTEM AND METHOD FOR DATA COMMUNITY DETECTION VIA DATA NETWORK TELEMETRY

(71) Applicant: BANK OF AMERICA CORPORATION, Charlotte, NC (US)

(72) Inventors: Conor Mitchell Liam Nodzak, Charlotte, NC (US); Brian C. Busch, Charlotte, NC (US); Fernando A. Maisonett, Charlotte, NC (US); Kyle S. Sorensen, Huntersville, NC (US); Shreyas Srinivas, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 0 days.

(21) Appl. No.: 17/989,139

(22) Filed: Nov. 17, 2022

(51) Int. Cl.
*G06F 16/00* (2019.01)
*G06F 16/23* (2019.01)
*G06F 16/242* (2019.01)
*G06F 16/2457* (2019.01)
*G06F 16/28* (2019.01)

(52) U.S. Cl.
CPC ........ *G06F 16/2365* (2019.01); *G06F 16/244* (2019.01); *G06F 16/2457* (2019.01); *G06F 16/285* (2019.01)

(58) Field of Classification Search
CPC .... G06F 18/2178; G06F 18/217; G06F 18/21; G06F 18/25; G06F 17/18; G06F 16/2477; G06F 16/2379; G06F 18/23; G06F 16/27; G06F 9/466; G06F 18/22; G06F 18/241; G06F 9/543; G06F 16/2465; G06F 16/285; G06F 16/90335; G06F 16/904; G06F 2111/10; G06F 30/20; G05B 19/4183; H04L 67/12; G06Q 30/0278; G06N 20/00; G06N 3/044
See application file for complete search history.

(56) References Cited

U.S. PATENT DOCUMENTS

| | | |
|---|---|---|
| 5,875,481 A | 2/1999 | Ashton et al. |
| 6,003,089 A | 12/1999 | Shaffer et al. |
| 6,044,445 A | 3/2000 | Tsuda et al. |
| 6,349,351 B1 | 2/2002 | Shimizu et al. |
| 7,631,140 B2 | 12/2009 | Saito et al. |
| 7,657,711 B2 | 2/2010 | Okuno |
| 8,014,287 B2 | 9/2011 | Matsushita et al. |
| 8,032,548 B2 | 10/2011 | Susairaj et al. |

(Continued)

*Primary Examiner* — Shyue Jiunn Hwa
(74) *Attorney, Agent, or Firm* — Moore & Van Allen PLLC; Andrew T. Wood

(57) ABSTRACT

Systems, computer program products, and methods are described herein for data community detection via data network telemetry. Packet header information and a corresponding record is received via a network sensing module. The record is analyzed to identify the direction(s) of the data transfer. The record is then validated and used to generate at least one directionality map, which is segmented into a plurality of time segments based on a user defined interval. A clustering algorithm is then used to determine at least one community for each of the directionality maps. The at least one directionality maps is then displayed at the user interface of an endpoint device. The at least one community is then provided with a functional group indicator, the functional group indicator compared to a stored functional group indicator to identify any mismatches.

14 Claims, 8 Drawing Sheets

(56) References Cited

U.S. PATENT DOCUMENTS

| | | | |
|---|---|---|---|
| 8,270,379 | B2 | 9/2012 | Okamasu et al. |
| 8,331,234 | B1 | 12/2012 | Newton et al. |
| 8,588,111 | B1 | 11/2013 | Kridlo |
| 8,996,913 | B2 | 3/2015 | Harada et al. |
| 9,787,546 | B2 | 10/2017 | Bardgett et al. |
| 9,848,432 | B2 | 12/2017 | Lee et al. |
| 9,979,605 | B2 | 5/2018 | Sinn |
| 10,127,501 | B2 * | 11/2018 | Grigoryan ......... G06F 16/24554 |
| 10,430,113 | B2 | 10/2019 | Ikarashi |
| 10,868,707 | B1 | 12/2020 | Friedman et al. |
| 10,970,942 | B2 | 4/2021 | Zhang |
| 11,274,929 | B1 * | 3/2022 | Afrouzi ................ G05D 1/0219 |
| 11,303,548 | B2 | 4/2022 | Nodzak et al. |
| 2002/0091749 | A1 | 7/2002 | Katayama |
| 2007/0171966 | A1 | 7/2007 | Light et al. |
| 2009/0198707 | A1 | 8/2009 | Rohner |
| 2009/0240790 | A1 | 9/2009 | Utsunomiya et al. |
| 2010/0115121 | A1 | 5/2010 | Roos et al. |
| 2011/0173400 | A1 | 7/2011 | Isono |
| 2013/0254891 | A1 | 9/2013 | Onoda |
| 2014/0286174 | A1 | 9/2014 | Iizuka et al. |
| 2015/0261599 | A1 | 9/2015 | Hara |
| 2016/0239230 | A1 | 8/2016 | Sato et al. |
| 2018/0196694 | A1 | 7/2018 | Banerjee et al. |
| 2018/0287876 | A1 * | 10/2018 | Strobel ................ H04L 41/142 |
| 2019/0215228 | A1 | 7/2019 | Ramachandran et al. |
| 2020/0036616 | A1 | 1/2020 | Kane et al. |
| 2020/0053173 | A1 | 2/2020 | Dasgupta et al. |
| 2020/0112525 | A1 | 4/2020 | Donley et al. |
| 2020/0167784 | A1 | 5/2020 | Kursun |
| 2020/0167785 | A1 | 5/2020 | Kursun |
| 2020/0167786 | A1 | 5/2020 | Kursun |
| 2020/0167787 | A1 | 5/2020 | Kursun |
| 2020/0169483 | A1 | 5/2020 | Kursun |
| 2020/0220812 | A1 | 7/2020 | Butcher et al. |
| 2021/0203595 | A1 | 7/2021 | Rao et al. |
| 2021/0216908 | A1 | 7/2021 | Lu et al. |
| 2021/0218634 | A1 | 7/2021 | Harter |
| 2023/0159887 | A1 * | 5/2023 | Parent .................. C12N 5/0617 435/366 |

* cited by examiner

SYSTEM AND METHOD FOR DATA COMMUNITY DETECTION VIA DATA NETWORK TELEMETRY

FIELD OF THE INVENTION

The present invention embraces a system for data community detection via data network telemetry.

BACKGROUND

Currently, entities that manage data consider logical groupings of applications that handle the data, such that the interdependencies between applications are determined through the aggregation of multiple systems of records. This approach may deliver some boundaries to form groupings, however these boundaries constantly evolve and change over time, nor do they detect any particular application operating outside of the application's normal conditions and known interactions. Accordingly, these traditional methods of community detection fail to consider any time-based dynamics which may better serve an entity in determining the optimal approach to carryout primary functions of the entity. As such, there is a need for a system and method for data community detection via data network telemetry.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later. Embodiments of the invention are directed to a system, method, or computer program product for data community detection via data network telemetry, the invention may include receiving, via a network and from a network sensing module, packet header information corresponding to a record associated with a first data transfer between a first computing device and a second computing device, analyzing, the record to identify the first data transfer as unidirectional or bidirectional, generating, based on a validation of the record, a first data transfer record for storage in a network directionality data store, wherein the first data transfer record is representative of the first data transfer from the first computing device to the second computing device, and wherein the first data transfer record is segmented into a plurality of time segments based on at least one user defined interval, generating, by a directionality map generator with a first configuration and based on the network directionality data store at a first time segment and a second time segment, a first directionality map corresponding to the first time segment and a second directionality map corresponding to the second time segment, the first and second directionality maps comprising a graphical representation of a data transfer relationship between the first computing device and the second computing device, wherein edge length of the directionality map correspond to a volume of data of the first data transfer, determining, using a clustering algorithm, at least one community for each of the first and second directionality maps, and causing to be displayed, at a user interface of an endpoint device, at least one of the first and second directionality maps.

In some embodiments, the packet header information includes octet information corresponding to a representation of an eight bit data transfer.

In some embodiments, the directionality of data transfer records is determined based on octet information associated with one or more data transfer records communicated between the first computing device and the second computing device.

In some embodiments, the system, computer program product, and/or computer implemented method may be further configured to store, based on the octet information, an indication of an erroneous data transfer in the first data transfer record, when the octet information is equal to zero.

In some embodiments, the system, computer program product, and/or computer implemented method may be further configured to receive, as an input from a user, a functional group indicator corresponding to each of the at least one communities, the functional group indicator corresponding to a label associated with computing devices in each of the at least one communities.

In some embodiments, the clustering algorithm is a Leiden algorithm.

In some embodiments, the system, computer program product, and/or computer implemented method may be further configured to export a chart comprising the functional group indicator and label for each of the communities and their corresponding computing devices, compare, for each of the computing devices, the functional group indicator to stored functional group indicators for an identical computing device, and identify mismatches between the functional group indicator and the stored functional group indicator.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1A:
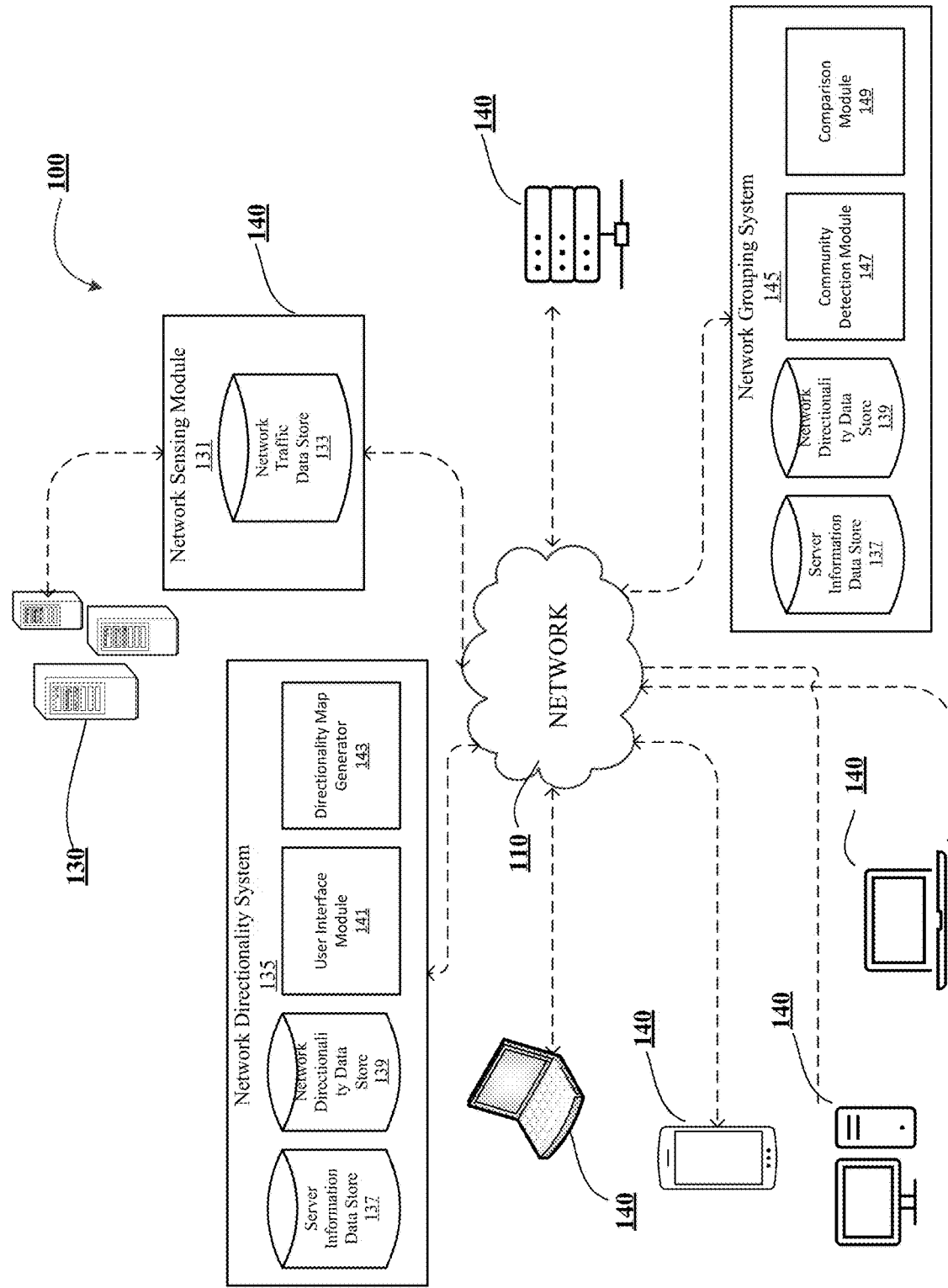
Figure 1B:
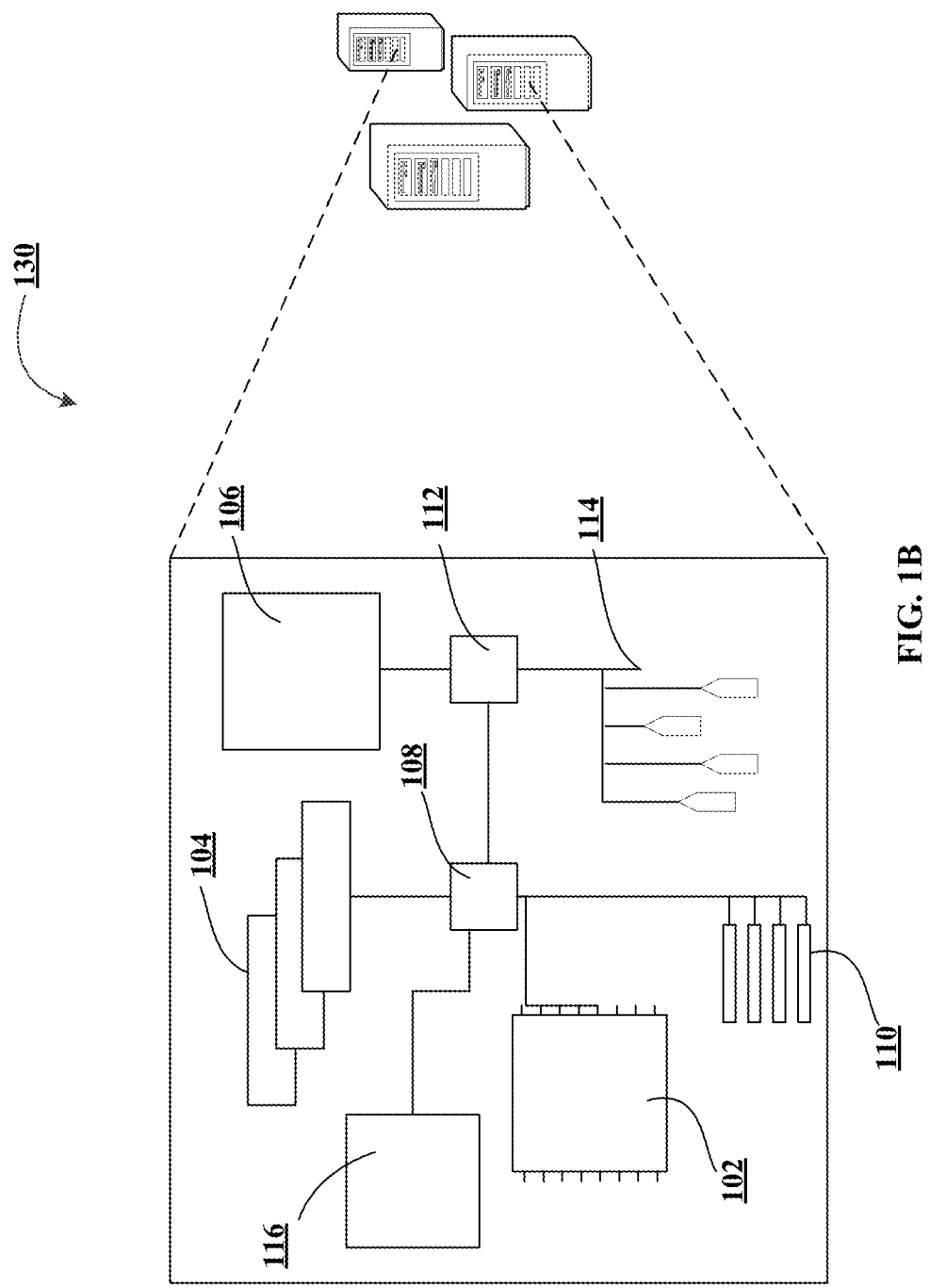
Figure 1C:
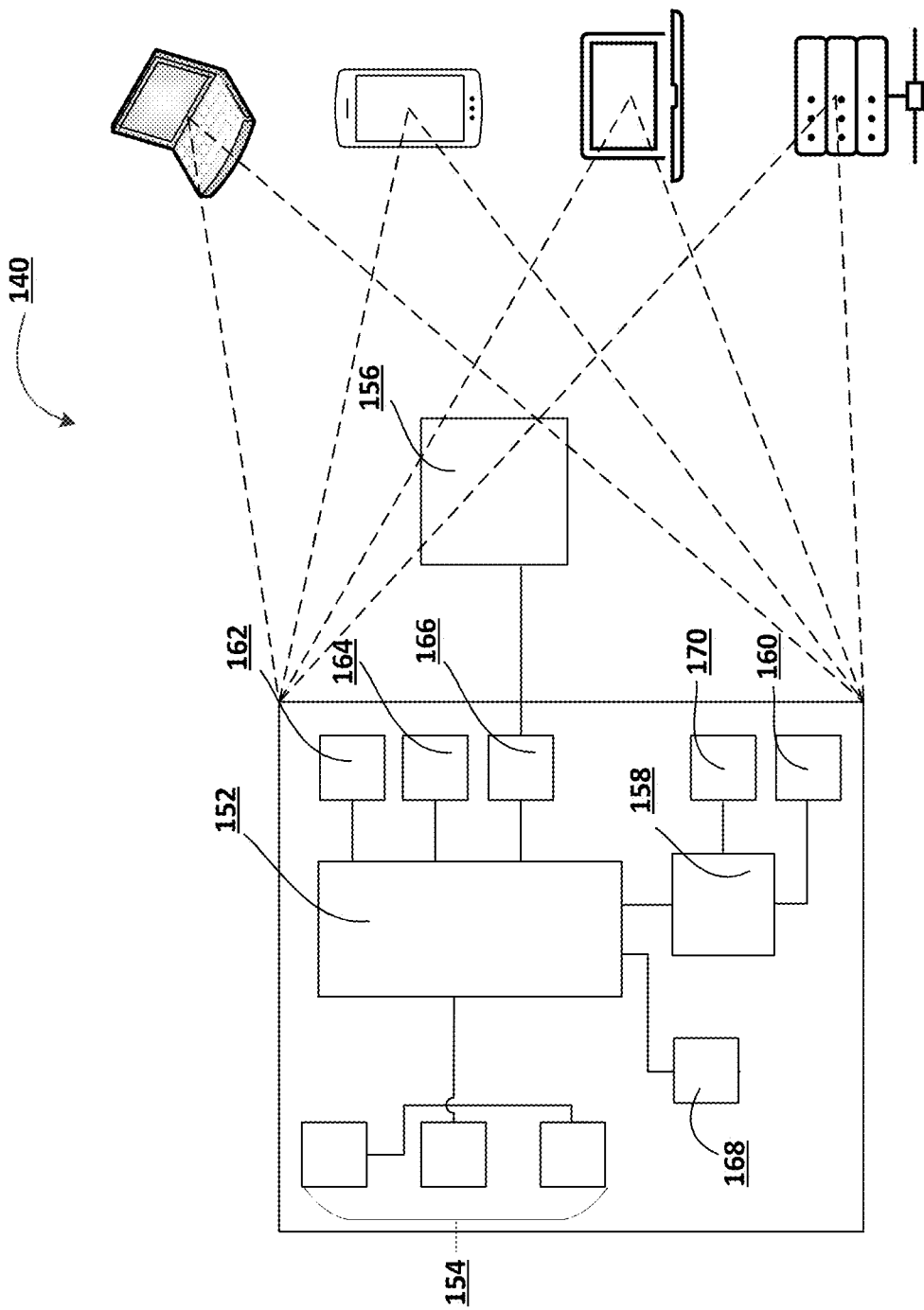
Figure 2:
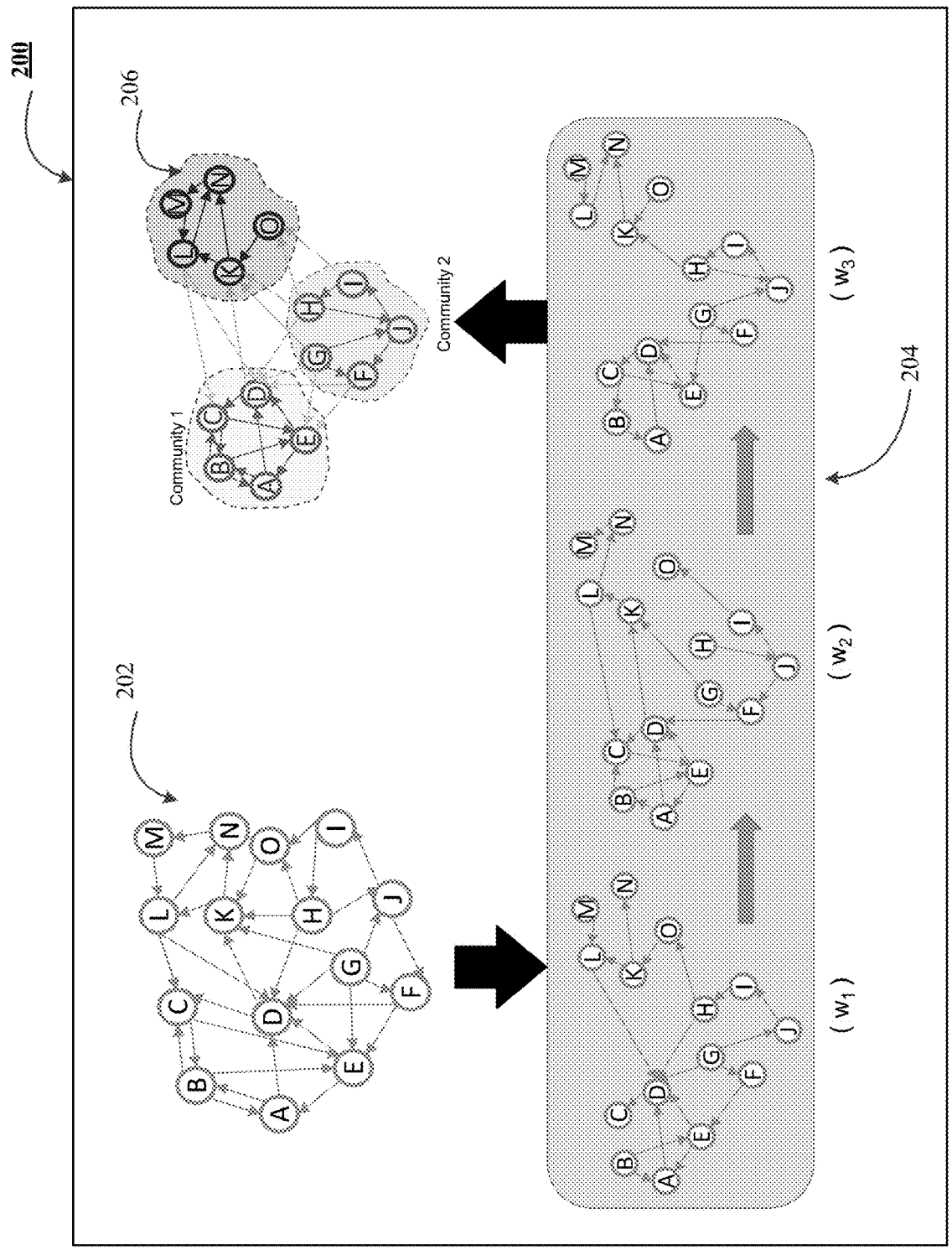
Figure 3A:
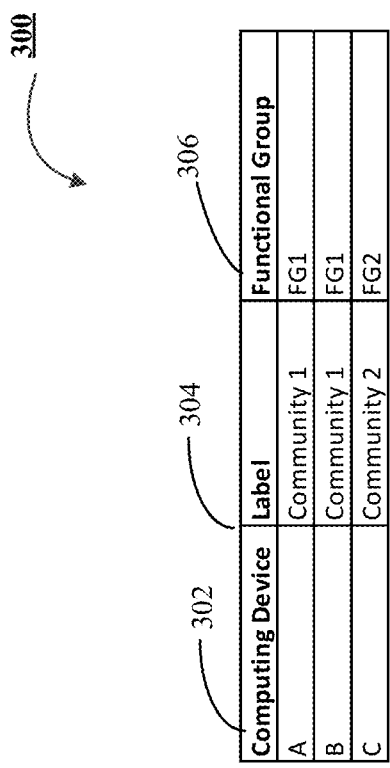
Figure 3B:
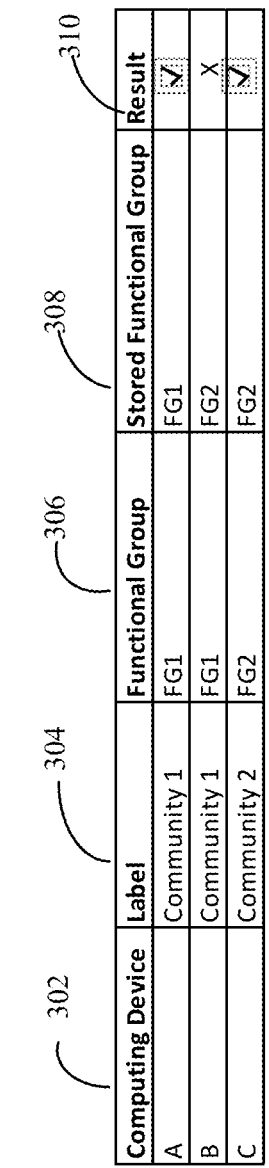
Figure 4:
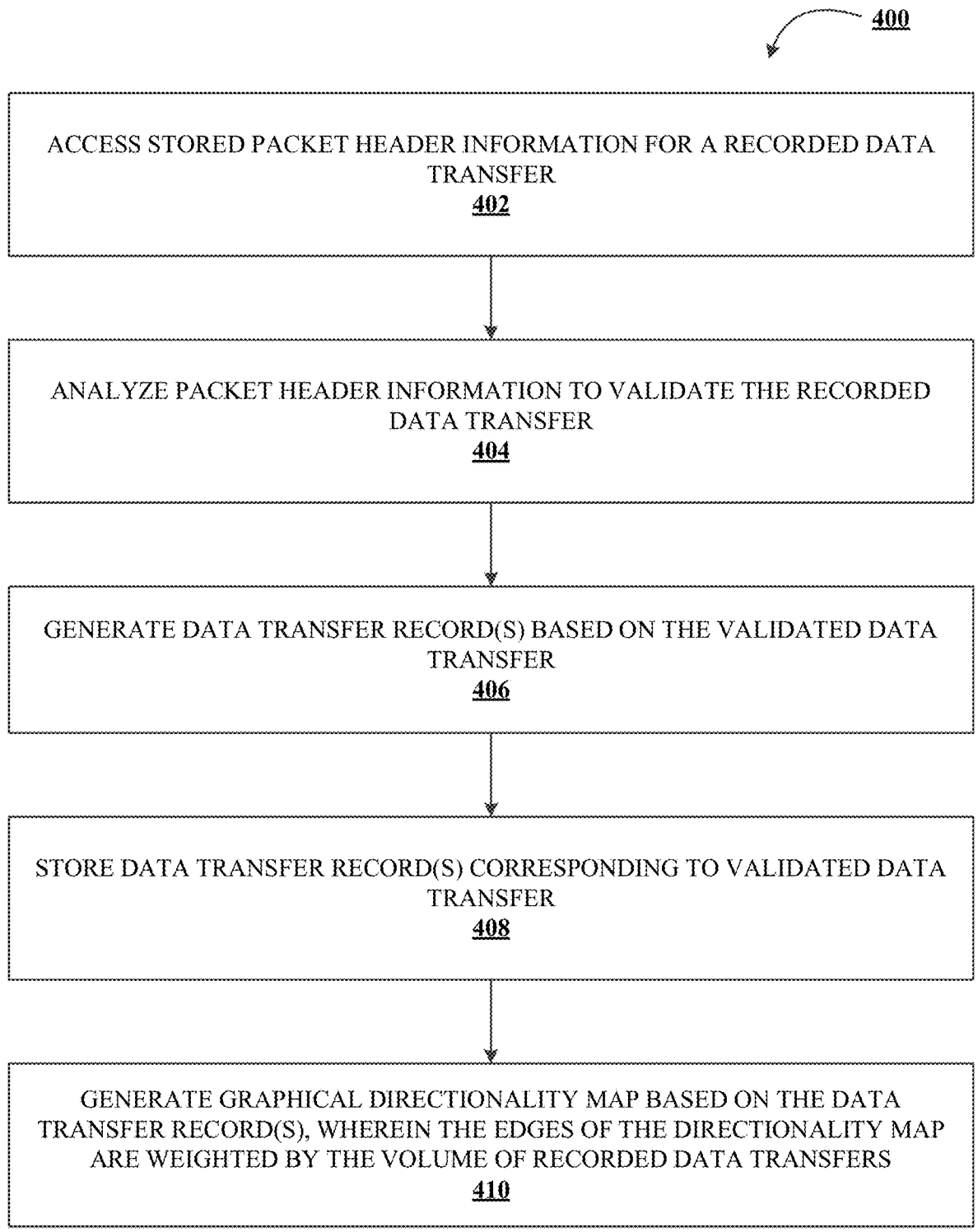
Figure 5:
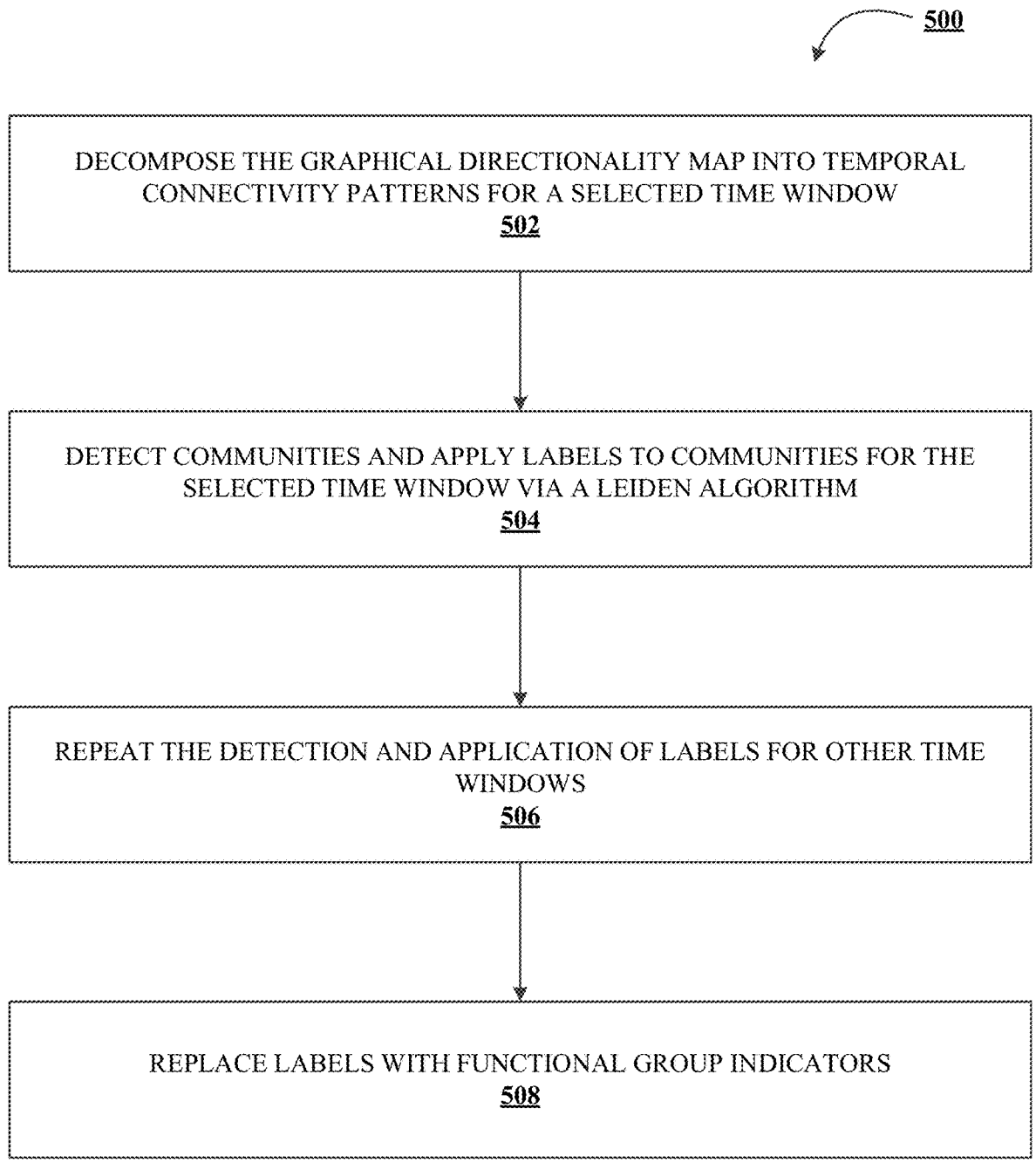
Figure 6:
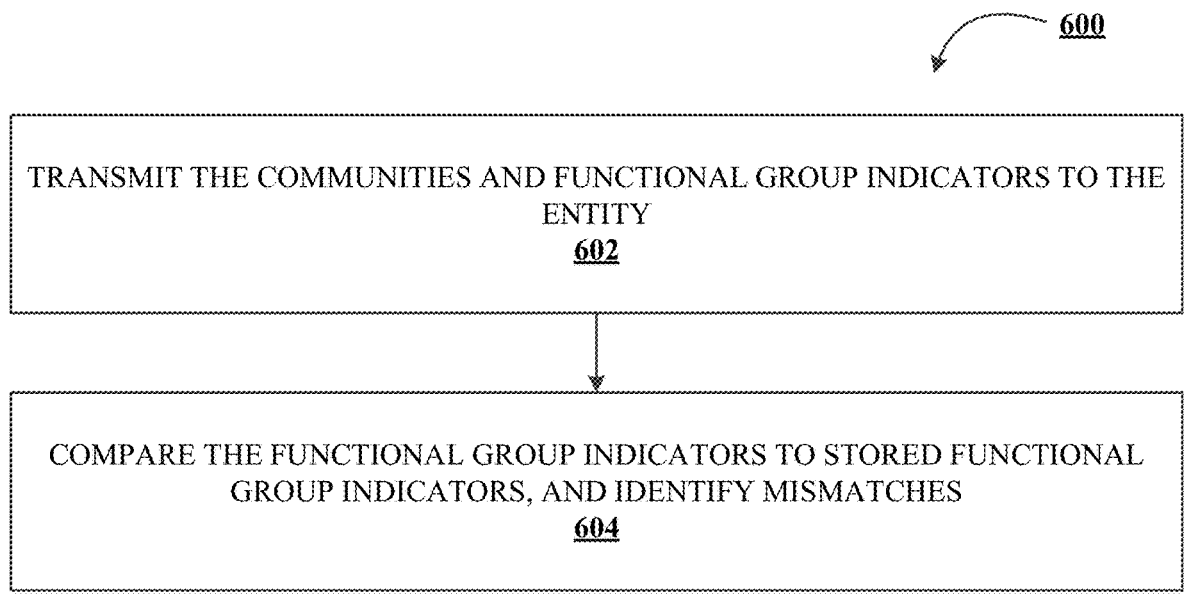

Having thus described embodiments of the invention in general terms, reference will now be made the accompanying drawings, wherein:

FIGS. 1A-1C illustrates technical components of an exemplary distributed computing environment for data community detection via data network telemetry, in accordance with an embodiment of the invention;

FIG. 2 illustrates process for decomposing a graphical directionality map into temporal connectivity patterns, in accordance with an embodiment of the invention;

FIG. 3A illustrates a first chart in accordance with an embodiment of the invention;

FIG. 3B illustrates a second chart in accordance with an embodiment of the invention;

FIG. 4 illustrates a process flow for generating a graphical directionality map, in accordance with an embodiment of the invention;

FIG. 5 illustrates a process flow for data community detection via data network telemetry, in accordance with an embodiment of the invention; and FIG. 6 illustrates a process flow for data community detection and function group comparison via data network telemetry, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data, such as electronic resource transfer or communication data. Typically, these data can be related to the customers of the entity, its products or services, the people who work for the organization, or any other aspect of the operations of the organization, such as communicative interactions between customers and people who work for the organization. As such, the entity may be any institution, group, association, financial institution, establishment, company, union, authority or the like, employing information technology resources for processing large amounts of data.

As described herein, a "user" may be an individual associated with an entity, or it may be a customer with a transactional relationship with the entity. As such, in some embodiments, the user may be an individual having past relationships, current relationships or potential future relationships with an entity. In some embodiments, the user may be an employee (e.g., an associate, a project manager, an IT specialist, a manager, an administrator, an internal operations analyst, or the like) of the entity or enterprises affiliated with the entity.

As used herein, a "user interface" may be a point of human-computer interaction and communication in a device that allows a user to input information, such as commands or data, into a device, or that allows the device to output information to the user. For example, the user interface includes a graphical user interface (GUI) or an interface to input computer-executable instructions that direct a processor to carry out specific functions. The user interface typically employs certain input and output devices such as a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of an application, or part of an application that serves as a foundation for a larger piece of software and drives the functionality of the software. In some embodiments, an engine may be self-contained, but externally controllable code that encapsulates powerful logic designed to perform or execute a specific type of function. In one aspect, an engine may be underlying source code that establishes file hierarchy, input and output methods, and how a specific part of an application interacts or communicates with other software and/or hardware. The specific components of an engine may vary based on the needs of the specific application as part of the larger piece of software. In some embodiments, an engine may be configured to retrieve resources created in other applications, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, "determining" may encompass a variety of actions. For example, "determining" may include calculating, computing, processing, deriving, investigating, ascertaining, and/or the like. Furthermore, "determining" may also include receiving (e.g., receiving information), accessing (e.g., accessing data in a memory), and/or the like. Also, "determining" may include resolving, selecting, choosing, calculating, establishing, and/or the like. Determining may also include ascertaining that a parameter matches a predetermined criterion, including that a threshold has been met, passed, exceeded, and so on.

As used herein, an "endpoint device" may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

Prior to the invention described herein, entities that manage data typically aggregate multiple systems of records to consider logical groupings of applications throughout the entity. This traditional method may deliver some boundaries which form groupings, however these boundaries are known to constantly change over time as the needs of the entity change. Furthermore, these traditional methods do not detect any particular applications operating outside of the applications' normal conditions and known interactions. Accordingly, such methods of community detection fail to consider any time-based dynamic approaches to better serve an entity by optimizing the carrying out of primary functions of the entity.

The invention disclosed herein solves the problems by formulating it as a graph analytics temporal community detection problem applied over a dynamic graph constructed using evidence based data flows from network telemetry mappings. The invention produces temporal clusters of nodes into groups or "communities" based on the weighted edge density patterns of the aggregate volumes of data sent between the nodes (e.g., servers and/or endpoint devices) over time. These communities, as having been determined, are then compared to an incumbent community labeling process which an entity may currently have in place. In this way, there is an evidence-based analysis of node membership and the node's involvement in data movement. Since the graphs have a temporal aspect to them, this may be leveraged to see and detect community membership changes over time.

Accordingly, the present invention receives infrastructure details from a network layer, the network layer providing packets that comprise routing details of information over the network, wherein the packets comprise segmented data payloads configured to be transmitted by packets from one IP address to another IP address. The direction of data movement is determined, and a directionality map (e.g., directionality chart) is created. The directionality map and data therein is used by a clustering algorithm to form temporal clusters based on the weighted edge density sent between nodes of the directionality map over time. Thereafter, a dynamic multigraph of the telemetry communications with time-stamped edges may be exported and viewed on a user interface. A comparison process is then used to reconcile the labels for each node with those previously known by the entity to determine if any mismatches have occurred (e.g., changes to community membership).

What is more, the present invention provides a technical solution to a technical problem. As described herein, the technical problem includes boundaries between servers and/or endpoint devices (and their resulting communities) that are known to constantly change over time as the needs of the entity change with no current feedback loop available to alert the entity of such changes. Thus, entities must currently rely on manual records such as data flow attestations and the like. The technical solution presented herein allows for automated, consistent, accurate, and wide-range detection of communities for servers and/or endpoint devices in a network based on the data flow to and/or from said servers and/or endpoint devices. In particular, the system is an improvement over existing compliance evaluation systems by determining boundaries and/or communities (i) with fewer steps to achieve the solution, thus reducing the amount of computing resources, such as processing resources, storage resources, network resources, and/or the like, that are being used, (ii) providing a more accurate solution to problem, thus reducing the number of resources required to remedy any errors made due to a less accurate solution, (iii) removing manual input and waste from the implementation of the solution, thus improving speed and efficiency of the process and conserving computing resources, (iv) determining an optimal amount of resources that need to be used to implement the solution, thus reducing network traffic and load on existing computing resources. Furthermore, the technical solution described herein uses a rigorous, computerized process to perform specific tasks and/or activities that were not previously performed. In specific implementations, the technical solution bypasses a series of steps previously implemented, thus further conserving computing and manual resources.

FIGS. 1A-1C illustrate technical components of an exemplary distributed computing environment for data community detection via data network telemetry 100, in accordance with an embodiment of the invention. As shown in FIG. 1A, the distributed computing environment 100 contemplated herein may include a system 130, an endpoint device(s) 140, and a network 110 over which the system 130 and endpoint device(s) 140 communicate therebetween. FIG. 1A illustrates only one example of an embodiment of the distributed computing environment 100, and it will be appreciated that in other embodiments one or more of the systems, devices, and/or servers may be combined into a single system, device, or server, or be made up of multiple systems, devices, or servers. Also, the distributed computing environment 100 may include multiple systems, same or similar to system 130, with each system providing portions of the necessary operations (e.g., as a server bank, a group of blade servers, or a multi-processor system).

The endpoint device(s) 140 may represent various forms of electronic devices, including user input devices such as personal digital assistants, cellular telephones, smartphones, laptops, desktops, and/or the like, merchant input devices such as point-of-sale (POS) devices, electronic payment kiosks, and/or the like, electronic telecommunications device (e.g., automated teller machine (ATM)), and/or edge devices such as routers, routing switches, integrated access devices (IAD), and/or the like.

The network 110 may be a distributed network that is spread over different networks. This provides a single data communication network, which can be managed jointly or separately by each network. Besides shared communication within the network, the distributed network often also supports distributed processing. The network 110 may be a form of digital communication network such as a telecommunication network, a local area network ("LAN"), a wide area network ("WAN"), a global area network ("GAN"), the Internet, or any combination of the foregoing. The network 110 may be secure and/or unsecure and may also include wireless and/or wired and/or optical interconnection technology.

In some embodiments, the system 130 and the endpoint device(s) 140 may have a client-server relationship in which the endpoint device(s) 140 are remote devices that request and receive service from a centralized server, i.e., the system 130. In some other embodiments, the system 130 and the endpoint device(s) 140 may have a peer-to-peer relationship in which the system 130 and the endpoint device(s) 140 are considered equal and all have the same abilities to use the resources available on the network 110. Instead of having a central server (e.g., system 130) which would act as the shared drive, each device that is connect to the network 110 would act as the server for the files stored on it.

The system 130 may represent various forms of servers, such as web servers, database servers, file server, or the like, various forms of digital computing devices, such as laptops, desktops, video recorders, audio/video players, radios, workstations, or the like, or any other auxiliary network devices, such as wearable devices, Internet-of-things devices, electronic kiosk devices, mainframes, or the like, or any combination of the aforementioned.

In some embodiments, the distributed computing environment 100 may include one or more network sensing modules 131 associated with detecting and monitoring communications between computing devices (e.g., the one or more endpoint devices 140 and/or servers) over a network (e.g., the network 110). The network sensing modules 131 may be communicatively coupled with one or more computing devices to monitor network communications between the servers in system 130 and/or endpoint devices 140. The one or more network sensing modules 131 may detect and monitor information (e.g., metadata) associated with network communications between system 130 and/or clusters of servers, and/or endpoint devices 140. For example, the one or more network sensing modules 131 may detect and/or record packet header information containing metadata associated with a data transfer between system 130. The packet header information may include server identifiers, port identifiers of servers, IP addresses, application identifiers, timestamps, packet information (e.g., the number of packets transferred), and the like.

The network sensing module 131 may further be configured to detect the volume of data between the servers in system 130 and/or endpoint devices 140. In the same manner as the network sensing module 131 may detect and monitor information (e.g., metadata, headers) associated with network communications between system 130 and/or clusters of servers, and/or endpoint devices 140, it may also detect the number of packets of data transferred. Using an assumption that all packets are of roughly the same size given the protocol (IPv6, IPv4, etc), the volume of data may be calculated by multiplying the number of packets by the assumed packet size. The assumed size for network payloads may be determined by subtracting the amount of data required for protocol headers from the maximum transmission unit ("MTU") size for the protocol. Additionally, or alternatively, the network sensing module 131 may receive from a user and/or determine the payload size for the network, and calculate the volume of data by multiplying the number of packets by this payload size.

Network sensing module 131 may include network traffic data store 133. In some embodiments, after the one or more network sensing modules 131 detect and/or record packet header information via the network 110, the packet header information may be stored in one or more network traffic data stores 133. In some embodiments, the aggregated packet header information may be stored in the network traffic data store (e.g., network traffic data store 133) associated with a specific network sensing module (e.g., network sensing module 131). Alternatively, network traffic data store 133 may be externally located from the one or more network sensing modules 131. The packet header information may be stored in the unstructured state (e.g., raw network traffic data) in which it is gathered from the network (e.g., network 110).

The network sensing module 131 monitors network traffic data between servers and/or clusters of servers within the distributed computing environment. Additionally or alternatively, the network directionality system 135 and/or network grouping system 145 may directly monitor network traffic data between servers and/or clusters of servers within the distributed computing environment via one or more network monitoring devices that may monitor network traffic information between servers and/or clusters of servers and may aggregate the information over specified intervals of time.

In some embodiments, the distributed computing environment 100 may include a network directionality system 135 configured to aggregate, standardize, and illustrate network communications (e.g., data transfer between computing devices such as server or endpoint devices) acquired from the one or more network sensing modules 131 within the distributed computing environment 100. In some embodiments, the one or more network sensing modules 131 may be included in the network directionality system 135, network grouping system 145, or be located external to the network directionality system 135 and network grouping system 145 (e.g., in the form of third-party network sensing modules where of the third-party network sensing modules may provide data in a different format).

In some embodiments, the network directionality system 135 may include a user interface module 141, where one or more user interface screens of the user interface module 141 are presented to a user via a display device coupled to a computing device (e.g., endpoint device 140). The user interface module 141 may enable one or more users to centrally access and/or analyze the information aggregated by the one or more network sensing modules 131. One or users may configure one or more of the elements of the network directionality system 135 as described herein via the one or more user interface screens of the user interface module 141.

In some embodiments, the network directionality system 135 may include a server information data store 137. The server information data store 137 may include information associated with known computing devices (e.g., endpoint devices 140) and/or servers (e.g., system 130) of the distributed computing environment 100. The information stored at the server information data store 137 may include server identifiers (e.g., IP addresses), port identifiers for servers, geographic locations associated with each server, information for systems and/or applications associated with each server, and/or information indicating users and/or business units that are responsible for maintaining each server.

In some embodiments, the network directionality system 135 may be configured to automatically fetch information for storage in the server information data store 137 from one or more data stores of the distributed computing environment 100. For example, the network directionality system 135 may periodically (e.g., every hour, every day, every week, and the like) or continuously fetch information from data stores associated with server information. The fetched information may be stored in the server information data store 137. Additionally or alternatively, a user may configure information stored at the server information data store 137 via a user interface screen provided by the user interface module 141. For example, a user may manually input information associated with a server (e.g., system 130) at a user interface screen provided by the user interface module 141.

In some embodiments, the distributed computing environment 100 may include a network directionality data store 139. In some embodiments, the network directionality system 135 may be configured to receive and/or access the packet header information, and/or volume of data transferred, stored in the network traffic data stores (e.g., network traffic data store 133) of the one or more network sensing modules 131. The network directionality system 135 may automatically analyze, format, and/or restructure the aggregated packet header information and/or volume of data transferred to generate one or more data records (e.g., data transfer records) for data transfers between system 130 of the distributed computing environment 100. The one or more data transfer records generated by the network directionality system 135 may be stored in the network directionality data store 139, where the data transfer records may be filtered and/or searched via a user interface screen provided by the user interface module 141 based on server information (e.g., IP address identifiers, port identifiers, server cluster information, and the like) and/or transfer information (e.g., packet information, timestamp information, and the like). For analysis of the packet header information, the network directionality system 135 may identify if packet header information for a data transfer is associated with a unidirectional data transfer or a bidirectional data transfer based on an algorithmic process. For example, for packet header information associated with a unidirectional data transfer between servers 130 or between a server in system 130 and an endpoint device 140, the network directionality system 135 may algorithmically analyze the packet header information, extract specific elements of the packet header information (e.g., a timestamp, an IP address of the source server, an IP address of the destination server, port identifiers, packet data, and the like), and store the extracted information in a standardized data structure within the network directionality data store 139 as a unidirectional data transfer record. The unidirectional data transfer record may be accessible via a user interface screen provided the user interface module 141.

In some embodiments, if packet header information for a data transfer stored in a network traffic data store (e.g., network traffic data store 133) corresponds to a bidirectional data transfer between system 130 (e.g., server), the network directionality system 135 may algorithmically analyze the packet header information to identify a bidirectional data transfer. Based on the algorithmic analysis described in U.S. Pat. No. 11,303,548 incorporated by reference herein, the network directionality system 135 may extract specific elements of the packet header information (e.g., a timestamp, an IP address of the first server, an IP address of the second server, port identifiers, packet data, and the like). Based on the information extracted from the packet header information, the network directionality system 135 may generate a pair of unidirectional data transfer records that are representative of the bidirectional data transfer between the servers for storage in the network directionality data store 139. The generated pair of unidirectional data records may each include an identifier to associate the unidirectional data transfer record with a bidirectional data transfer (e.g., there exists an additional unidirectional data record corresponding to the bidirectional data transfer).

In some embodiments, the network directionality system 135 may include a directionality map generator 143 configured to generate a graphical directionality map depicting the relationship between the servers (e.g., the computing devices in system 130) involved in one or more data transfers within the distributed computing environment 100. The graphical directionality map may be generated by the directionality map generator 143 based on the data transfer records stored in the network directionality data store 139 and may be displayed by a user interface screen provided by the user interface module 141. After generation and storage of one or more unidirectional data transfer records by the network directionality system 135, the directionality map generator 143 may be configured to analyze the unidirectional data transfer records stored in the network directionality data store 139 and, based on the analysis, generate a graphical directionality map depicting the relationship between a first server and a second server. Each server involved in a data transfer may be depicted as a node in the graphical directionality map generated by the directionality map generator 143. The graphical directionality map may depict a link between nodes (e.g., servers) to represent the directional aspect of the data transfer between servers (e.g., source server to destination server). For example, for a bidirectional data transfer between a first server and a second server, the bidirectional data transfer may be represented as bidirectional link between nodes, based on a pair of unidirectional data transfer records stored in the network directionality data store 139.

For a graphical directionality map involving a depiction of a bidirectional data transfer, the directionality map generator 143 may be configured to generate a graphical directionality map, where the first server and the second server are represented as nodes and a bidirectional link between the nodes that represents the bidirectional nature of the data transfer. The graphical directionality map may include one or more selectable elements to be displayed on the user interface screen that may be selected via one or input devices. When selected, the selectable elements may display information associated with the selected server(s) and/or the data transfer(s) (e.g., the links between nodes). For example, at a user interface screen provided by the user interface module 141, an individual (e.g., a system administrator) may select a server (e.g., a node) on the graphical directionality map, which may cause the map to display information associated with the server (e.g., IP address, port identifiers, associated systems and/or applications, additional data transfers involving the selected server, and the like) from the server information data store 137 and/or the network directionality data store 139. Additionally, at a user interface screen provided by the user interface module 141, a user may select a data transfer between servers (e.g., a link) on the graphical directionality map, which may cause the graphical directionality map to display information associated with the data transfer (e.g., a time stamp, packet data for the data transfer, source and/or destination port identifiers, and the like)

In some embodiments, via inputs communicated to the user interface module 141, a user may configure the directionality map generator 143 to generate a graphical directionality map depicting one or more data transfers. At a user interface screen, a user may select individual data transfer records to be included in a graphical directionality map at the user interface module 141. In some embodiments, an individual (e.g., system administrator) may select one or more data transfer records to be included in a generated graphical directionality map based on the time stamp associated with the data transfer, the server(s) associated with the data transfer, the systems and/or applications associated with the server(s) involved in the data transfer, and the like. For example, a user may select a 30-minute interval of time (e.g., 9:00 am-9:30 am) for which to map data transfer operations. The directionality map generator 143 may be configured to access data transfer records in the network directionality data store 139 for the configured interval of time and generate a graphical directionality map based on the associated data transfer records, where the graphical directionality map is displayed by a user interface screen provided by the user interface module 141. Additionally, for example, a user may select a cluster of servers (e.g., multiple servers of system 130) for which to map data transfer operations. The directionality map generator 143 may be configured to access data transfer records in the network directionality data store 139 for the configured cluster of servers and generate a graphical directionality map for the associated data transfer records, where the graphical directionality map is displayed by a user interface screen provided by the user interface module 141.

In some embodiments, the distributed computing environment 100 may include a network grouping system 145 configured to analyze and cluster (e.g., "group") network communications (e.g., data transfer between computing devices such as server or endpoint devices) acquired from the network directionality system(s) 135 within the distributed computing environment 100.

In some embodiments, the network grouping system 145 may include a community detection module 147, where the affinity between nodes in the network detection system 135 is calculated using a clustering algorithm for a user-selected time period, such that nodes which communicate frequently (e.g., transmit large volumes of data between the nodes) are grouped with other nodes to which communication is frequent for the given time period. Over an entire distributed network 110, clusters of frequently communicating devices, servers, and the like are observed, and the boundaries between the groups are determined by using "edge detection." Moreover, the communities and boundaries between two or more communities (e.g., groups of nodes) may be presented to users via a graphical user interface. The communities may be presented to a user via a display device coupled to a computing device (e.g., endpoint device 140). This action of displaying the communities may be accomplished through the user interface module 141 of the network directionality system, or in some embodiments the network grouping system 145 may similarly comprise a user interface module identical in functionality to that of user interface module 145. The user interface module 141 may enable one or more users to centrally access and/or analyze the information determined and rendered from the network grouping system 145.

In some embodiments, the network grouping system 145 may include a server information data store 137. In some embodiments, the server information data store 137 may be the same server information data store 137 of the network directionality system 135. In other embodiments, the server information data store 137 may be a mirror (e.g., exact replication in real-time) of the server information data store 137 in the network directionality system 135, but functioning as separate data store in another location on network 110.

In some embodiments, the network grouping system 145 may include a network directionality data store 139. In some embodiments, the network directionality data store 139 may be the same network directionality data store 139 of the network directionality system 135. In other embodiments, the network directionality data store 139 may be a mirror (e.g., exact replication in real-time) of the network directionality data store 139 in the network directionality system 135, but functioning as separate data store in another location on network 110.

Nonetheless, the network directionality data store 139 and server information data store 137 perform the same functions as previously described in detail in reference to the network directionality system 135.

In some embodiments, the network grouping system 145 may be configured to automatically fetch information for storage in the server information data store 137 from one or more data stores of the distributed computing environment 100. For example, the network grouping system 145 may periodically (e.g., every hour, every day, every week, and the like) or continuously fetch information from data stores associated with server information. The fetched information may be stored in the server information data store 137. Additionally or alternatively, a user may configure information stored at the server information data store 137 via a user interface screen provided by the user interface module 141. For example, a user may manually input information associated with a server (e.g., system 130) at a user interface screen provided by the user interface module 141.

The network grouping system 145 may automatically analyze, format, and/or restructure the aggregated packet header information from the network directionality data store 139 to assist in the grouping (e.g., clustering) of the one or more data records (e.g., data transfer records) for data transfers between the servers of system 130, and/or endpoint devices 140, of the distributed computing environment 100, as obtained by the network directionality system. The network grouping system 145 may store the one or more data transfer records in the network directionality data store 139, where the data transfer records may be filtered and/or searched via a user interface screen provided by the user interface module 141 based on server information (e.g., IP address identifiers, port identifiers, server cluster information, and the like) and/or transfer information (e.g., packet information, timestamp information, and the like). For analysis of the packet header information, the network grouping system 145 may identify if packet header information for a data transfer is associated with a unidirectional data transfer or a bidirectional data transfer based on an algorithmic process. For example, for packet header information associated with a unidirectional data transfer between servers 130 or between a server in system 130 and an endpoint device 140, the network grouping system 145 may algorithmically analyze the packet header information, extract specific elements of the packet header information (e.g., a timestamp, an IP address of the source server, an IP address of the destination server, port identifiers, packet data, and the like), and store the extracted information in a standardized data structure within the network directionality data store 139 as a unidirectional data transfer record. The unidirectional data transfer record may be accessible via a user interface screen provided the user interface module 141.

In some embodiments, the network grouping system 145 may include a comparison module 149 configured to receive a chart of the communities of the various servers in system 130 and endpoint devices 140 (collectively, "computing device(s)") determined by the community detection module 147, and each of the communities labeled as "labels" by the community detection module. Further, the comparison module 149 may configured to receive from an endpoint device 140 a first chart or array listing various computing devices and their respective labels as determined by a manual process for attributing labels to computing devices, the functionality of which is not necessary to understand the present invention. What should be understood, however, is that each computing device has been previously given a label and/or functional group, often based on manual attestations or other methods, the accuracy of such label and/or functional group is necessary to determine such that each label and/or functional group is inclusive of the proper, most accurate grouping of computing devices. Accordingly, a first chart or array of computing devices may be supplied to the comparison module 149 with listing of a plurality of computing devices and stored functional groups that precede the process described herein. The comparison module 149 identifies a computing device by name, IP address, or the like, in a second chart (e.g., the chart provided by the community detection module 147) by referencing the column associated with the computing devices and subsequently parsing the first chart, iterating through the column associated with the computing devices in the first chart, character by character, for an identical computing device name or IP address to that of the second chart. Once the identical computing device has been located on the first chart, the comparison module 149 may retrieve the functional group provided by the community detection module 142 in the second chart and iterate through the function group, character by character, while simultaneously iterating through the existing functional group in the first chart character by character, comparing each character of the functional group in the second chart to the existing functional group in the first chart. When two characters are not identical, the computing device is flagged in the chart as being a mismatch. Accordingly, when the entire cell within the first and/or second chart has been evaluated and no such mismatch has been found, the computing device may be flagged in the second chart as being a match.

It is to be understood that the structure of the distributed computing environment and its components, connections and relationships, and their functions, are meant to be exemplary only, and are not meant to limit implementations of the inventions described and/or claimed in this document. In one example, the distributed computing environment 100 may include more, fewer, or different components. In another example, some or all of the portions of the distributed computing environment 100 may be combined into a single portion or all of the portions of the system 130 may be separated into two or more distinct portions.

FIG. 1B illustrates an exemplary component-level structure of the system 130, in accordance with an embodiment of the invention. As shown in FIG. 1B, the system 130 may include a processor 102, memory 104, input/output (I/O) device 116, and a storage device 110. The system 130 may also include a high-speed interface 108 connecting to the memory 104, and a low-speed interface 112 connecting to low speed bus 114 and storage device 110. Each of the components 102, 104, 108, 110, and 112 may be operatively coupled to one another using various buses and may be mounted on a common motherboard or in other manners as appropriate. As described herein, the processor 102 may include a number of subsystems to execute the portions of processes described herein. Each subsystem may be a self-contained component of a larger system (e.g., system 130) and capable of being configured to execute specialized processes as part of the larger system.

The processor 102 can process instructions, such as instructions of an application that may perform the functions disclosed herein. These instructions may be stored in the memory 104 (e.g., non-transitory storage device) or on the storage device 110, for execution within the system 130 using any subsystems described herein. It is to be understood that the system 130 may use, as appropriate, multiple processors, along with multiple memories, and/or I/O devices, to execute the processes described herein.

The memory 104 stores information within the system 130. In one implementation, the memory 104 is a volatile memory unit or units, such as volatile random access memory (RAM) having a cache area for the temporary storage of information, such as a command, a current operating state of the distributed computing environment 100, an intended operating state of the distributed computing environment 100, instructions related to various methods and/or functionalities described herein, and/or the like. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like for storage of information such as instructions and/or data that may be read during execution of computer instructions. The memory 104 may store, recall, receive, transmit, and/or access various files and/or information used by the system 130 during operation.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, input/output (I/O) device 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other.

FIG. 1C illustrates an exemplary component-level structure of the endpoint device(s) 140, in accordance with an embodiment of the invention. As shown in FIG. 1C, the endpoint device(s) 140 includes a processor 152, memory 154, an input/output device such as a display 156, a communication interface 158, and a transceiver 160, among other components. The endpoint device(s) 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the endpoint device(s) 140, including instructions stored in the memory 154, which in one embodiment includes the instructions of an application that may perform the functions disclosed herein, including certain logic, data processing, and data storing functions. The processor may be implemented as a chipset of chips that include separate and multiple analog and digital processors. The processor may be configured to provide, for example, for coordination of the other components of the endpoint device(s) 140, such as control of user interfaces, applications run by endpoint device(s) 140, and wireless communication by endpoint device(s) 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of endpoint device(s) 140 with other devices. External interface 168 may provide, for example, for wired communication in some implementations, or for wireless communication in other implementations, and multiple interfaces may also be used.

The memory 154 stores information within the endpoint device(s) 140. The memory 154 can be implemented as one or more of a computer-readable medium or media, a volatile memory unit or units, or a non-volatile memory unit or units. Expansion memory may also be provided and connected to endpoint device(s) 140 through an expansion interface (not shown), which may include, for example, a SIMM (Single In Line Memory Module) card interface. Such expansion memory may provide extra storage space for endpoint device(s) 140 or may also store applications or other information therein. In some embodiments, expansion memory may include instructions to carry out or supplement the processes described above and may include secure information also. For example, expansion memory may be provided as a security module for endpoint device(s) 140 and may be programmed with instructions that permit secure use of endpoint device(s) 140. In addition, secure applications may be provided via the SIMM cards, along with additional information, such as placing identifying information on the SIMM card in a non-hackable manner.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the endpoint device(s) 140 to transmit and/or receive information or commands to and from the system 130 via the network 110. Any communication between the system 130 and the endpoint device(s) 140 may be subject to an authentication protocol allowing the system 130 to maintain security by permitting only authenticated users (or processes) to access the protected resources of the system 130, which may include servers, databases, applications, and/or any of the components described herein. To this end, the system 130 may trigger an authentication subsystem that may require the user (or process) to provide authentication credentials to determine whether the user (or process) is eligible to access the protected resources. Once the authentication credentials are validated and the user (or process) is authenticated, the authentication subsystem may provide the user (or process) with permissioned access to the protected resources. Similarly, the endpoint device(s) 140 may provide the system 130 (or other client devices) permissioned access to the protected resources of the endpoint device(s) 140, which may include a GPS device, an image capturing component (e.g., camera), a microphone, and/or a speaker.

The endpoint device(s) 140 may communicate with the system 130 through communication interface 158, which may include digital signal processing circuitry where necessary. Communication interface 158 may provide for communications under various modes or protocols, such as the Internet Protocol (IP) suite (commonly known as TCP/IP). Protocols in the IP suite define end-to-end data handling methods for everything from packetizing, addressing and routing, to receiving. Broken down into layers, the IP suite includes the link layer, containing communication methods for data that remains within a single network segment (link); the Internet layer, providing internetworking between independent networks; the transport layer, handling host-to-host communication; and the application layer, providing process-to-process data exchange for applications. Each layer contains a stack of protocols used for communications. In addition, the communication interface 158 may provide for communications under various telecommunications standards (2G, 3G, 4G, 5G, and/or the like) using their respective layered protocol stacks. These communications may occur through a transceiver 160, such as radio-frequency transceiver. In addition, short-range communication may occur, such as using a Bluetooth, Wi-Fi, or other such transceiver (not shown). In addition, GPS (Global Positioning System) receiver module 170 may provide additional navigation- and location-related wireless data to endpoint device(s) 140, which may be used as appropriate by applications running thereon, and in some embodiments, one or more applications operating on the system 130.

The endpoint device(s) 140 may also communicate audibly using audio codec 162, which may receive spoken information from a user and convert it to usable digital information. Audio codec 162 may likewise generate audible sound for a user, such as through a speaker, e.g., in a handset of endpoint device(s) 140. Such sound may include sound from voice telephone calls, may include recorded sound (e.g., voice messages, music files, etc.) and may also include sound generated by one or more applications operating on the endpoint device(s) 140, and in some embodiments, one or more applications operating on the system 130.

Various implementations of the distributed computing environment 100, including the system 130 and endpoint device(s) 140, and techniques described here can be realized in digital electronic circuitry, integrated circuitry, specially designed ASICs (application specific integrated circuits), computer hardware, firmware, software, and/or combinations thereof.

FIG. 2 illustrates a process for decomposing a graphical directionality map into temporal connectivity patterns, in accordance with an embodiment of the invention. All of some of the processes illustrated graphically may be executed by the community detection module 147. The graphical directionality map 202 is provided to the system by the directionality map generator 143, and displayed on a user interface, with each node representing a computing device (e.g., servers and/or endpoint devices). While directionality of data flow between computing devices may be indicated with arrows indicating directionality of data flow or net data flow, the clustering algorithm as applied herein to these nodes receives the graphical directionality map 202 in a transformed presentation, as illustrated by the multigraph 204, where the graphical directionality map 202 is first transformed by calculating the directionality arrows in between nodes in various lengths. The length of each directionality arrow is illustrated based on the volume of data between each node, such that longer directionality arrows represent larger amounts of data transferred between the nodes, while shorter arrows represent smaller amounts of data transferred between the nodes. In some embodiments, the volume of data may be the net volume, accounting for the bi-directional data flow, with one direction being a positive data flow and the other negative, the arrow pointing in the direction of the most voluminous data flow and the length of said arrow corresponding to the sum of the positive and negative data flows. In some embodiments, bi-directional arrows may be displayed on the graphical directionality map to indicate bi-directional flow, however the length of the arrow may correspond to a sum of the total amount of data flow in both directions.

The multigraph 204 may present one or more of the transformed graphical directionality maps in sequence, with each of the transformed graphical directionality maps corresponding to an interval of time selected by a user. As one non-limiting example, a user may select a 30-minute interval of time (e.g., 9:00 am-9:30 am) for which to map data transfer operations between nodes, on various days of the week such as Monday, Tuesday, and Wednesday. The multigraph 202 may present the transformed graphical directionality map $w_1$ referring to the time interval corresponding to Monday, transformed graphical directionality map $w_2$ referring to the time interval corresponding to Tuesday, and transformed graphical directionality map $w_3$ referring to the time interval corresponding to Wednesday. By presenting each transformed graphical directionality map, a user may be presented with a visual indicator of volatility in data flow from any two nodes. Further, the element of time, as determined by the selected interval(s) of time, allows for specialized analysis and community detection (e.g., clustering) through algorithms as will be described in detail herein.

Community detection and quality is evaluated with various metrics related to the structure of the community at each time segment. In some embodiments, there may be a weighted conductance applied for a given community, such that greater relevance and importance are granted to intervals of time (e.g., time segments) which are most recent to the present time. The algorithm applied (such as the Leiden algorithm) to the transformed graphical directionality maps may be an algorithm which takes into account weighted edges, weighted by volume of data as determined by the network sensing module 131, or in some embodiments time-weighted edges may be utilized. However, in other embodiments, other algorithms may be utilized which use unweighted edges, such the Clauset-Newman-Moore Algorithm or the like.

Since data transfers (e.g., data flow) between nodes occur at specific times and dates, and are generally not steady in data flow throughout a large period of time, temporal graphs may be utilized with time-stamped edges, or through a multigraph as previously described. A temporal graph is a type of graph where edges record a timestamp, the timestamp indicating the time at which the edge exists.

As is understood by one of ordinary skill in the art of data analytics and community detection, the Leiden Algorithm is a bottom-up hierarchical community detection algorithm used to extract communities from large networks, initialized from an original graph where each node on the original graph is provided a unique community of their own. The algorithm optimizes modularity (through a scale of −0.5 representing non-modular clustering, to 1, representing fully modular clustering) and measures densities of edges within a community relative to the density of edges outside of the community. After the first communities are determined by optimizing modularity at each node, each community is grouped into one node and the first step is repeated. To further illustrate, the modularity of each node is maximized by repeating a two-step process iteratively, where (i) each node is given its own community by assignment, and (ii) modularity is calculated by moving the node to a neighboring node. Steps (i) and (ii) are repeated for all communities connected to any given node, and the node is placed into the community which has been calculated to increase modularity greatest. If there is no increase in modularity possible, the node remains it the original community. This is repeated for all nodes. The resulting communities 206 are illustrated graphically in FIG. 2.

Next, the algorithm may group together all of the nodes determined to share a common community, and label these communities as nodes themselves, any communication between nodes within each of these communities (e.g., intra-community data flow) is shown as a self-loop in the new community node, and links between nodes in a new community node to another community node is represented by weighted edges. Thereafter, the first iterative process may be re-applied to the new network of nodes.

While communities may be determined by the community detection module 147, it is discovered as a result of the invention described herein that these resulting communities generally correspond to functional business groups within an entity. For example, a marketing department may generally conduct activities on a group of systems 130 and endpoint devices 140 which not only transfer data between each other, but also with other functional business groups, such as accounting, human resources, payroll, engineering. Similarly, in some embodiments, various groups of systems 130 and endpoint devices 140 (e.g., communities) may correspond to domestic data relationships, while others may correspond to foreign data relationships. While the number of different types of communities are seemingly endless depending on the application of the system and individual characteristics of entities, it is important that each community be assigned a text indicator of the general functional business group to which it corresponds. Accordingly, the community detection module 147 may be configured to receive, as an input from a user through the user interface module 141 through a text box or similar data entry object, a name for such communities. While the first entry of a name (e.g., functional group indicator 306) may be input by a user manually, it is contemplated that the functional group indicator 306 may be automatically populated through various machine learning processes as will be understood by a person with ordinary skill in the art. The machine learning process would first receive the manually input name, and for each new iteration or application of the community detection module 141 may predict through supervised or unsupervised learning techniques, based on the previous instances of determining a community for a given group of nodes, a functional group indicator 306. The machine learning process may predict the functional group for each of the nodes within a community and use the functional group indicator 306 common to the majority of nodes to assign a predicted functional group to the community.

FIG. 3A illustrates a first chart 300 in accordance with an embodiment of the invention. A first chart 300 may be provided by the community detection module 147, either fully completed with computing devices 302, labels 304, and functional groups 306, or in some embodiments partially completed with computing devices 302 and labels 304, with the functional groups 306 to be inserted manually by a user. In other embodiments, the computing devices 302, labels 304, and functional groups 306 may all be required to be entered manually by a user. In any case, the community detection module may provide at least the framework of the first chart 300.

The computing devices 302 and their respective labels 304 are determined based on the communities assigned by the community detection module in FIG. 2, based on the nodes and the communities of said nodes. The resulting first chart 300 may then be supplied (e.g., transmitted) to the comparison module 149.

FIG. 3B illustrates a second chart 302 in accordance with an embodiment of the invention. The second chart 302 may be comprised of the first chart 300, with the first chart 300 modified by the comparison module 149 to add additional sections such as columns and/or rows to chart 300. The comparison module may add these additional sections as illustrated in FIG. 3B, such as stored functional groups 308 and/or results 310.

The stored functional group indicator 308 is a listing of the functional group known by the entity systems at any given point, such that the entity wishes to compare the functional group indicator 306 to a listing of a plurality of computing devices and stored functional groups that precede the process described herein. For example, the community detection module 147 may have determined that a certain computing device "B" is associated with a particular business unit (e.g., functional group) "FG1". However, in a previous iteration of the community detection process outlined in FIG. 2 may have determined that computing device "B" is associated with the functional group "FG2".

To accomplish such comparisons, the stored functional group indicator 308 for each computing device may be imported by the comparison module 149 from a secondary server or storage device containing the information. These stored functional groups 308 are then placed into the second chart 302, and a comparison function is executed to compare the stored functional group indicator 308 to the functional group indicator 306. In some embodiments, a results 310 column and/or row is provided, such that a visual indicator of the comparison function is provided, in the form of check marks, coloration of a box of the chart, and/or other symbols to indicate matches or mismatches.

It is understood that although the first and second charts 300, 302 are illustrated in FIGS. 3A and 3B as charts of rows and columns such as those in a spreadsheet, first and second charts 300, 302 may additionally or alternatively be configured as structured data in .csv, .txt, or any other type of format which is capable of displaying information related to the computing devices, labels, functional groups, and stored functional groups.

FIG. 4 illustrates a process flow 400 for generating a graphical directionality map, in accordance with an embodiment of the invention. At block 402, the network directionality system 135 may access and/or fetch packet header information stored in the network traffic data stores (e.g., network traffic data store 133) from the one or more network sensing modules 131 via the network 110. At a user interface screen provided by the user interface module 141, a user may configure the network sensing modules 131 from which packet header information is accessed and/or fetched. For example, based on the information stored at the server information data store 137, a system administrator may configure the network directionality system 135 to fetch packet header information from the network sensing module 131 to analyze data transfer operations between servers in the system 130.

In some cases, the network directionality system 135 may fetch and/or access specified packet header information, including packet header information associated with data transfers for a specific interval of time, specific servers in system 130 and/or clusters of servers in system 130, endpoint devices 140, a specific geographic location, and/or specific applications and/or systems of the enterprise computing system 110. For example, at a user interface screen provided by the user interface module 141, a user may configure the network directionality system 135 to fetch packet header information for data transfers to and/or from a first server and a second server over a 15-minute interval. In some cases, the network directionality system 135 may automatically access and/or fetch packet header information from specified network sensing modules 131 on a periodic basis (e.g., every hour, every 12 hours, every day, and the like). At a user interface screen provided by the user interface module 141, a user may configure automatic access and/or fetching of the packet header information by the network directionality system 135. Additionally or alternatively, specific packet header information associated with data transfer for specific servers of system 130 and/or clusters of servers of system 130 may be manually selected based on the information (e.g., server identifying information) stored at the server information data store 137.

At block 404, the network directionality system 135 may analyze the accessed and/or fetched packet header information for the configured server(s). The packet header information may be validated for accurate recordation of a data transfer by the one or more network sensing modules 131, modified based on the directionality of the data transfer indicated by the packet header information (e.g., unidirectional, bidirectional), and/or prepared for generation into one or more data transfer records. After analysis of the packet header information, the network directionality system 135 may generate one or more data transfer records based on the validated records included in the packet header information at block 406. For example, a single data transfer record may be generated for validated packet header information that indicates a unidirectional data transfer between servers. A pair of data transfer records may be generated for validated packet header information that indicates a bidirectional data transfer between servers, with each of the pair of data transfer records including an identifier that indicates that each record is associated with an associated data transfer record as a part of the bidirectional data transfer.

At block 408, the generated data transfer record(s) may be stored in one or more standard data structures (e.g., databases, data tables, or the like) within the network directionality data store 139. The data transfer record(s) may be accessible within the network directionality data store 139 via one or more user interface screens of the user interface module 141. Via a user interface screen provided by the user interface module 141, a user may analyze and/or filter the stored data transfer records for previously recorded data transfers derived from the network sensing modules 131. For example, at a user interface screen, a user may search for data transfer records associated with a server within the network directionality data store 139 and analyze data transfer records associated with the server. Further, for example, the user may filter and/or search the data transfer records associated with a server based on the timestamp associated with the data transfer records, the application(s) and/or system(s) associated with the data transfer records, the geographic location of servers associated with the data transfer records for the server, size (e.g., packet information) of the data transfer of each the data transfer records, and the like.

After storing the generated data transfer record(s) within the network directionality data store 139, the network directionality system 135 may trigger the directionality map generator 143 to generate a graphical directionality map based on the stored data transfer record(s) at block 410. The generated graphical directionality map may be displayed and/or be made accessible by the user interface module 141 at one or more user interface screens. The edge(s) of the generated graphical directionality map may be weighted by the volume of recorded data transfers between the nodes connected by edge(s), the volume of recorded data transfers determined by the network sensing module 131 as previously described. At a user interface screen, a user may configure the directionality map generator 143 to generate the graphical directionality map based on one or more configured data transfer records. In some cases, at block 410, the directionality map generator 143 may automatically generate a graphical directionality map based on the storage of one or more data transfer records in the network directionality data store 139. The directionality map generator 143 may generate the graphical directionality map based on a configuration (e.g., a base configuration), where the configuration may be modified via a user interface screen provided by the user interface module 141. For example, if a pair of data transfer records are stored (e.g., at 208), the directionality map generator 143 may automatically generate a graphical directionality map at 210 based on the pair of data transfer records stored and a base configuration. At a user interface screen provided by the user interface module 141, the user may select one or more data transfer records for inclusion in the graphical directionality map based on the stored data transfer records in the network directionality data store 139. For example, after generation and storage of the data transfer record(s) at 406 and 408, a system administrator may select stored data transfer records for a cluster of servers 133 over a 2-hour time interval via a user interface screen provided by the user interface module 141. The system administrator may configure the directionality map generator 143 to generate the graphical directionality map based on the selected data transfer records and display the graphical directionality map for further analysis at a user interface screen provided by the user interface module 141. The illustrative event sequence 400 as described herein may occur simultaneously for one or more individual records included in packet header information.

FIG. 5 illustrates a process flow 500 for data community detection via data network telemetry, in accordance with an embodiment of the invention. In block 502, the community detection module 147 decomposes the graphical directionality map into temporal connectivity patterns for a selected time window. As previously described, the graphical directionality map between various nodes may be different depending on the time window(s) selected by a user, such that various communities determined by the system described herein are different depending on the time window selected. Accordingly, the graphical directionality map may need to be decomposed (e.g., separated from) the graphical directionality map displayed on the user interface such as to isolate the graphical directionality map for a given time window of interest to a user. In some embodiments, various graphical directionality maps may be displayed adjacent one another to illustrate a multigraph on the user interface.

Continuing in block 504, the community detection module 147 detects communities and applies labels to the communities for the selected time window via a Leiden algorithm. Although the Leiden Algorithm has been described in detail herein, the following is a simplified summary: The Leiden Algorithm extracts communities by initializing the algorithm from the graphical directionality map, where each node on the graphical directionality map is provided a unique community. The algorithm optimizes modularity and measures densities of edges (the edges based on volume of data flow for the graphical directionality map(s) herein) within a community relative to the density of edges outside of the community. If there is no increase in modularity possible, the node remains it the original community.

It shall be appreciated that any grouping or clustering algorithm such as the Leiden algorithm may apply labels to the communities to which it determines. The labels may be standard character labels such as "1", "2", "3", etc., or in some embodiments the labels may be "Community 1", "Community 2", "Community 3", etc. It shall be appreciated that any number of labels may be applied to the communities detected by the Leiden algorithm, such labeling performed automatically by the algorithm. For purposes herein, the labeling may be temporary, such that the labels are temporary files in the network directionality data store 139 subject to be overwritten by a user or the community detection module 147 with function groups.

Continuing in block 506, the community detection module 147 repeats the detection and application of labels for the other time windows. Since it is known that various data transfers occur between servers in system 130 and/or endpoint devices 140 at different times, dates, etc., it may be important for the user to specify via the user interface additional time windows for analysis. Further, since the communities determined by the Leiden algorithm may differ depending on the time window, the various time windows and their respective communities may be weighted differently by the user such that more mathematical weight is given to a more recent time window than those which are less recent. For example, a fraction may be multiplied by the label of a community for a computing device for a first time window, plus another fraction multiplied by the label of a community for a computing device for a second time window, divided by the sum of the fractions and rounded to the nearest whole number.

In block 508, the labels are replaced with functional groups. As previously described, the community detection module 140 may prompt a user via the user interface to assign a functional group to each of the communities identified in blocks 504 and/or 506. The user may fill in a text box on the user interface with the corresponding functional groups given the user's knowledge of the entity and the business units therein.

It is important to note that while a user may input a functional group into the user interface for one or more communities identified by the network grouping system 145, both the communities and the functional groups, as well as the corresponding computing devices therein are mapped to fill in one or more underlying charts, as illustrated with respect to FIGS. 3A and 3B.

As a result of the process illustrated in blocks 504 and 506, at least one first chart 300 is generated by the network grouping system 145, and cells within the rows and columns are mapped to the output of the Leiden algorithm for the computing devices 302 and labels 304. Further, the input of functional groups 306 through the user interface is mapped to the first chart 300. As previously described with respect to FIGS. 3A-3B, the first and second charts 300, 302 may additionally or alternatively be configured as structured data in .csv, .txt, or any other type of format which is capable of displaying information related to the computing devices, labels, functional groups, and stored functional groups.

FIG. 6 illustrates a process flow for data community detection and function group comparison via data network telemetry, in accordance with an embodiment of the invention. In block 602, the comparison module 149 may transmit the communities and functional groups to the entity. The communities and functional groups for a given time window are recorded, as previously described, in chart 300. The chart 300 may be electronically transmitted to one or more servers in system 130, or to one or more user devices 140, all of which are operatively coupled to the comparison module 149. In some embodiments, the comparison module 149 may not transmit the communities and functional groups (e.g., the first chart 300), and instead a user may view the chart 300 on the user interface via the user interface module 141 of the network directionality system 135, and additional data as necessary for the comparison as illustrated hereinafter may be transmitted to the user interface module 141.

In any case, the chart 300 may be modified such that additional details surrounding the incumbent (e.g., "stored") functional group 308 may be added and/or compared to the functional group indicator 306 determined by the community detection module 147. This modification of the chart 300 may occur simply by adding additional rows, columns, or data input fields, depending on the form factor and structure type of the chart 300.

In block 604, the comparison module compares the functional groups to stored functional groups and identifies mismatches. A user may wishes to compare the functional group indicator 306 to a listing of a plurality of computing devices and stored functional groups that precede the process described herein. For example, the community detection module 147 may have determined that a certain computing device "B" is associated with a particular business unit (e.g., functional group) "FG1". However, in a previous iteration of the community detection process outlined in FIG. 2 may have determined that computing device "B" is associated with the functional group "FG2".

To accomplish such comparisons, the stored functional group indicator 308 (e.g., incumbent functional groups) for each computing device may be imported by the comparison module 149 from a secondary server or storage device containing the information. These stored functional groups 308 are then placed into the second chart 302, and a comparison function is executed to compare the stored functional group indicator 308 to the functional group indicator 306. The comparison module 149 may then index the first character of the functional group indicator 306 and the first character of the stored functional group indicator 308. The comparison module 149 then checks via a comparison command to see whether the first character is the same between the functional group indicator 306 and the stored functional group indicator 308. If they are not the same, the comparison module 149 returns an indicator of a mismatch. If they are the same, the comparison module 149 may then continue to index to the second character in the stored functional group indicator 308 to the functional group indicator 306. The process is repeated, continuing to index until the string in either the stored functional group indicator 308 or the functional group indicator 306 is fully iterated through, or a mismatch is found. If no mismatches are found, there is determined to be a match. In some embodiments, a results 310 column and/or row is provided, such that a visual indicator of the comparison function is provided, in the form of check marks, coloration of a box of the chart, and/or other symbols to indicate matches or mismatches.

As will be appreciated by one of ordinary skill in the art, the present invention may be embodied as an apparatus (including, for example, a system, a machine, a device, a computer program product, and/or the like), as a method (including, for example, a process, a computer-implemented process, and/or the like), or as any combination of the foregoing. Accordingly, embodiments of the present invention may take the form of an entirely software embodiment (including firmware, resident software, micro-code, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These computer-executable program code portions execute via the processor of the computer and/or other programmable data processing apparatus and create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

INCORPORATION BY REFERENCE

To supplement the present disclosure, this application further incorporates entirely by reference the following commonly assigned patent:

| U.S. Patent No. | Title | Filed On |
| --- | --- | --- |
| 11,303,548 | NETWORK DIRECTIONALITY SYSTEM | Jul. 30, 2020 |

What is claimed is:

1. A system for data community detection via data network telemetry, the system comprising:
at least one non-transitory storage device; and
at least one processor coupled to the at least one non-transitory storage device, wherein the at least one processor is configured to:
receive, via a network and from a network sensing module, packet header information corresponding to a record associated with a first data transfer between a first computing device and a second computing device;
analyze, the record to identify the first data transfer as unidirectional or bidirectional;
generate, based on a validation of the record, a first data transfer record for storage in a network directionality data store, wherein the first data transfer record is representative of the first data transfer from the first computing device to the second computing device, and wherein the first data transfer record is segmented into a plurality of time segments based on at least one user defined interval;
generate, by a directionality map generator with a first configuration and based on the network directionality data store at a first time segment and a second time segment, a first directionality map corresponding to the first time segment and a second directionality map corresponding to the second time segment, the first and second directionality maps comprising a graphical representation of a data transfer relationship between the first computing device and the second computing device, wherein edge length of the directionality map correspond to a volume of data of the first data transfer;
determine, using a Leiden algorithm, at least one community for each of the first and second directionality maps;
cause to be displayed, at a user interface of an endpoint device, at least one of the first and second directionality maps; and
determine, via a machine learning process of a community detection module, a functional group indicator corresponding to each of the at least one community, the functional group indicator corresponding to a label associated with computing devices in each of the at least one community.

2. The system of claim 1, wherein the packet header information comprises octet information corresponding to a representation of an eight bit data transfer.

3. The system of claim 2, wherein directionality of data transfer records is determined based on octet information associated with one or more data transfer records communicated between the first computing device and the second computing device.

4. The system of claim 2, wherein the at least one processor is further configured to:
store, based on the octet information, an indication of an erroneous data transfer in the first data transfer record, when the octet information is equal to zero.

5. The system of claim 1, wherein the at least one processor is further configured to:
export a chart comprising the functional group indicator and label for each of the communities and their corresponding computing devices;
compare, for each of the computing devices, the functional group indicator to stored functional group indicators for an identical computing device; and
identify mismatches between the functional group indicator and the stored functional group indicator.

6. A computer program product for data community detection via data network telemetry, the computer program product comprising a non-transitory computer-readable medium comprising code causing an apparatus to:
receive, via a network and from a network sensing module, packet header information corresponding to a record associated with a first data transfer between a first computing device and a second computing device;

analyze, the record to identify the first data transfer as unidirectional or bidirectional;

generate, based on a validation of the record, a first data transfer record for storage in a network directionality data store, wherein the first data transfer record is representative of the first data transfer from the first computing device to the second computing device, and wherein the first data transfer record is segmented into a plurality of time segments based on at least one user defined interval;

generate, by a directionality map generator with a first configuration and based on the network directionality data store at a first time segment and a second time segment, a first directionality map corresponding to the first time segment and a second directionality map corresponding to the second time segment, the first and second directionality maps comprising a graphical representation of a data transfer relationship between the first computing device and the second computing device, wherein edge length of the directionality map correspond to a volume of data of the first data transfer;

determine, using a Leiden algorithm, at least one community for each of the first and second directionality maps;

cause to be displayed, at a user interface of an endpoint device, at least one of the first and second directionality maps; and determine, via a machine learning process of a community detection module, a functional group indicator corresponding to each of the at least one community, the functional group indicator corresponding to a label associated with computing devices in each of the at least one community.

7. The computer program product of claim 6, wherein the packet header information comprises octet information corresponding to a representation of an eight bit data transfer.

8. The computer program product of claim 7, wherein directionality of data transfer records is determined based on octet information associated with one or more data transfer records communicated between the first computing device and the second computing device.

9. The computer program product of claim 7, wherein the non-transitory computer-readable medium comprising code further causes the apparatus to:

store, based on the octet information, an indication of an erroneous data transfer in the first data transfer record, when the octet information is equal to zero.

10. The computer program product of claim 6, wherein the non-transitory computer-readable medium comprising code further causes the apparatus to:

export a chart comprising the functional group indicator and label for each of the communities and their corresponding computing devices;

compare, for each of the computing devices, the functional group indicator to stored functional group indicators for an identical computing device; and identify mismatches between the functional group indicator and the stored functional group indicator.

11. A method for data community detection via data network telemetry, the method comprising:

receiving, via a network and from a network sensing module, packet header information corresponding to a record associated with a first data transfer between a first computing device and a second computing device;

analyzing, the record to identify the first data transfer as unidirectional or bidirectional;

generating, based on a validation of the record, a first data transfer record for storage in a network directionality data store, wherein the first data transfer record is representative of the first data transfer from the first computing device to the second computing device, and wherein the first data transfer record is segmented into a plurality of time segments based on at least one user defined interval;

generating, by a directionality map generator with a first configuration and based on the network directionality data store at a first time segment and a second time segment, a first directionality map corresponding to the first time segment and a second directionality map corresponding to the second time segment, the first and second directionality maps comprising a graphical representation of a data transfer relationship between the first computing device and the second computing device, wherein edge length of the directionality map correspond to a volume of data of the first data transfer;

determining, using a Leiden algorithm, at least one community for each of the first and second directionality maps;

causing to be displayed, at a user interface of an endpoint device, at least one of the first and second directionality maps; and determining, via a machine learning process of a community detection module, a functional group indicator corresponding to each of the at least one community, the functional group indicator corresponding to a label associated with computing devices in each of the at least one community.

12. The method of claim 11, wherein the packet header information comprises octet information corresponding to a representation of an eight bit data transfer.

13. The method of claim 12, wherein directionality of data transfer records is determined based on octet information associated with one or more data transfer records communicated between the first computing device and the second computing device.

14. The method of claim 11, wherein the method further comprises:

exporting a chart comprising the functional group indicator and label for each of the communities and their corresponding computing devices;

comparing, for each of the computing devices, the functional group indicator to stored functional group indicators for an identical computing device; and identifying mismatches between the functional group indicator and the stored functional group indicator.

\* \* \* \* \*